United States Patent
Abedini et al.

(10) Patent No.: US 11,490,390 B2
(45) Date of Patent: Nov. 1, 2022

(54) ENHANCED RESOURCE MANAGEMENT FOR MOBILE INTEGRATED ACCESS BACKHAUL (IAB)

(71) Applicant: QUALCOMM Incorporated, San Diego, CA (US)

(72) Inventors: Navid Abedini, Somerset, NJ (US); Jianghong Luo, Skillman, NJ (US); Karl Georg Hampel, Hoboken, NJ (US); Luca Blessent, Whitehouse Station, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 17/003,244

(22) Filed: Aug. 26, 2020

(65) Prior Publication Data
US 2021/0068096 A1    Mar. 4, 2021

Related U.S. Application Data

(60) Provisional application No. 62/892,966, filed on Aug. 28, 2019.

(51) Int. Cl.
*H04W 28/02* (2009.01)
*H04W 28/10* (2009.01)
*H04W 72/04* (2009.01)

(52) U.S. Cl.
CPC ..... *H04W 72/048* (2013.01); *H04W 72/0486* (2013.01)

(58) Field of Classification Search
None
See application file for complete search history.

(56) References Cited

U.S. PATENT DOCUMENTS

2016/0277209 A1*  9/2016  Lei ............... H04W 40/12
2017/0006499 A1*  1/2017  Hampel ......... H04W 28/10
(Continued)

FOREIGN PATENT DOCUMENTS

EP    1850626 A1    10/2007

OTHER PUBLICATIONS

Ericsson: "Node Failure in IAB Half-Duplexing", 3GPP Draft, 3GPP TSG-RAN WG1 Meeting #93, R1-1807226, 3rd Generation Partnership Project (3GPP), Mobile Competence Centre, 650, Route Des Lucioles, F-06921 Sophia-Antipolis Cedex, France, vol. RAN WG1, No. Busan, South Korea, May 21, 2018-May 25, 2018, May 20, 2018 (May 20, 2018), XP051442422, 3 pages, Retrieved from the Internet: URL: http://www.3gpp.org/ftp/Meetings%5F3GPP%5FSYNC/RAN1/Docs/. [retrieved on May 20, 2018] paragraphs [02.2]—[02.3] figures 2,3.

(Continued)

*Primary Examiner* — Sai Aung
(74) *Attorney, Agent, or Firm* — Norton Rose Fulbright US LLP

(57) ABSTRACT

This disclosure provides systems, methods, and apparatus, including computer programs encoded on computer storage media, for wireless communication by a mobile wireless node of a wireless backhaul communications network. In one aspect, the mobile wireless node determines a first set of communication resources for use by the mobile wireless node. The wireless node communicates with one or more wireless device, via one or multiple child links, using the first set of communication resources while the wireless backhaul communications network has a first topology and while the wireless backhaul communications network has a second topology.

30 Claims, 8 Drawing Sheets

(56) References Cited

U.S. PATENT DOCUMENTS

2019/0014500 A1    1/2019  Abedini et al.
2019/0327660 A1*  10/2019  Hong .................... H04L 5/0048
2020/0374871 A1*  11/2020  Liu ................... H04W 56/0015
2020/0404518 A1*  12/2020  Yuan .................... H04W 84/047
2021/0007011 A1*  1/2021  Zhu ....................... H04W 28/12

OTHER PUBLICATIONS

Huawei: "Resource Coordination Between Multi-Hop BH Links", 3GPP Draft, 3GPP TSG-RAN WG3 Meeting #104, R3-192820, Resource Coordination Between Multi-Hop BH Links, 3rd Generation Partnership Project (3GPP), Mobile Competence Centre, 650, Route Des Lucioles, F-06921 Sophia-Antipolis Cedex, vol. RAN WG3, No. Reno, Nevada, USA, May 13, 2019-May 17, 2019, May 13, 2019 (May 13, 2019), XP051732086, 2 pages, Retrieved from the Internet: URL: http://www.3gpp.org/ftp/Meetings%5F3GPP%5FSYNC/RAN3/Docs/R3%2D192820%2Ezip. [retrieved on May 13, 2019] p. 2.

International Search Report and Written Opinion—PCT/US2020/048096—ISA/EPO—Nov. 6, 2020.

NTT DOCOMO: et al., "Mechanisms for Resource Multiplexing Among Backhaul and Access Links", 3GPP Draft, 3GPP TSG RAN WG1 #97, R1-1906203, Mechanisms for Resource Multiplexing, 3rd Generation Partnership Project (3GPP), Mobile Competence Centre, 650, Route Des Lucioles, F-06921 Sophia-Antipolis Cedex, vol. RAN WG1, No. Reno, Nevada, USA, May 13, 2019-May 17, 2019, May 13, 2019 (May 13, 2019), XP051727657, 6 pages, Retrieved from the Internet: URL: http://www.3gpp.org/ftp/Meetings%5F3GPP%5FSYNC/RAN1/Docs/R1%2D1906203%2Ezip. [retrieved on May 13, 2019] paragraph [02. 4].

Qualcomm Incorporated: "Resource Management in IAB Network", 3GPP Draft, 3GPP TSG RAN WG1 Meeting #95, R1-1813419, 3rd Generation Partnership Project (3GPP), Mobile Competence Centre, 650, Route Des Lucioles, F-06921 Sophia-Antipolis Cedex, France, vol. RAN WG1, No. Spokane, US, Nov. 12, 2018-Nov. 16, 2018, Nov. 11, 2018 (Nov. 11, 2018), XP051555458, 8 Pages, Retrieved from the Internet: URL: http://www.3gpp.org/ftp/Meetings%5F3GPP%5FSYNC/RAN1/Docs/R1%2D1813419%2Ezip. [retrieved on Nov. 11, 2018] the whole document,p. 2, "Observation 1", and preceding paragraph.

* cited by examiner

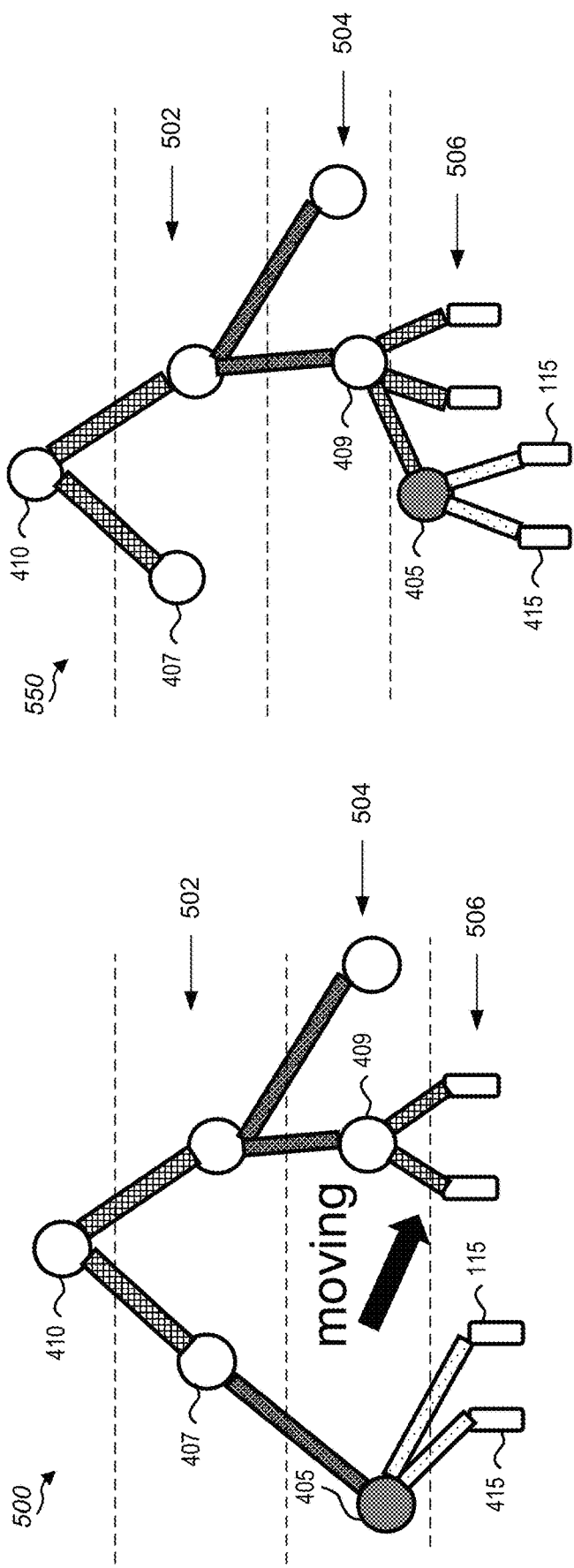
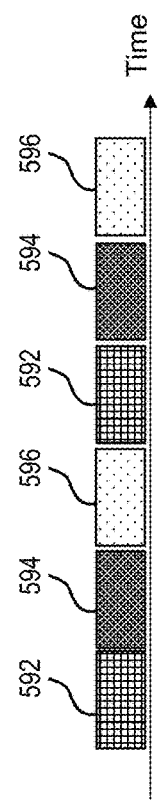
FIG. 5A
FIG. 5B
FIG. 5C

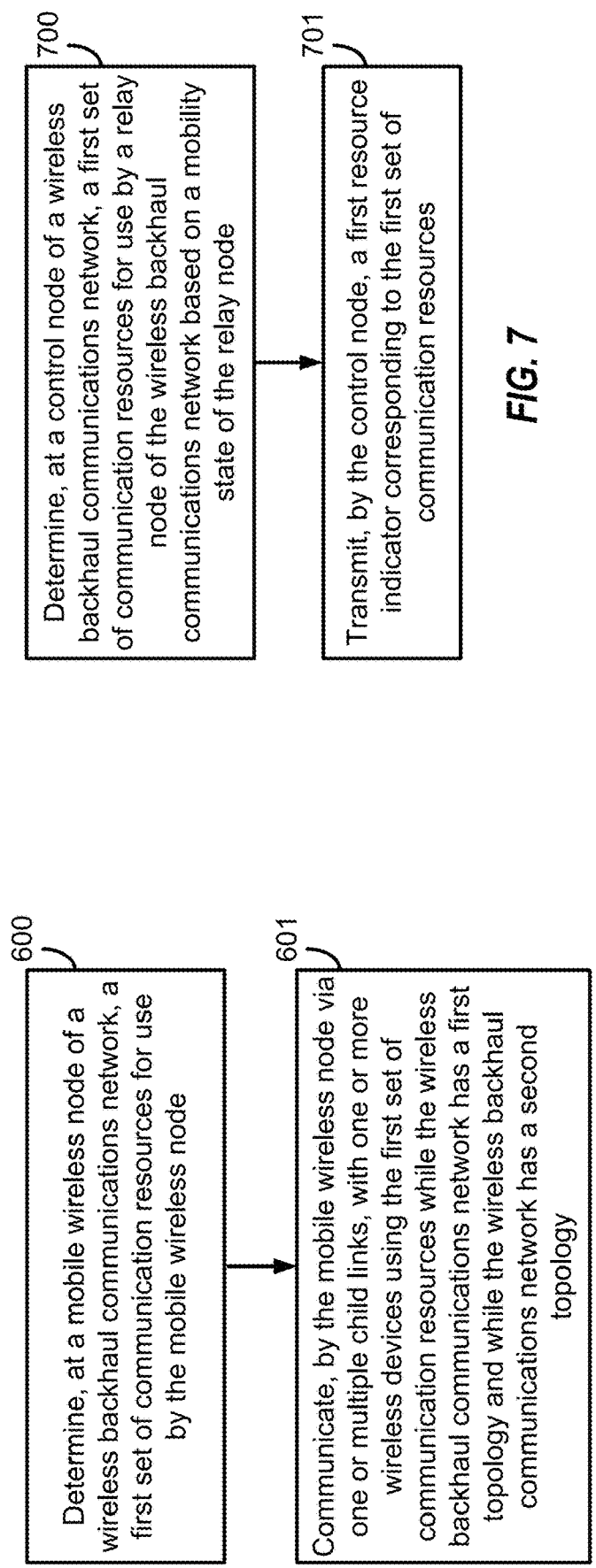

ENHANCED RESOURCE MANAGEMENT FOR MOBILE INTEGRATED ACCESS BACKHAUL (IAB)

CROSS-REFERENCE TO RELATED APPLICATIONS

This application claims the benefit of U.S. Provisional Patent Application No. 62/892,966, entitled, "ENHANCED RESOURCE MANAGEMENT FOR MOBILE INTEGRATED ACCESS BACKHAUL (IAB)," filed on Aug. 28, 2019, which is expressly incorporated by reference herein in its entirety.

BACKGROUND

Field

Aspects of the present disclosure relate generally to wireless communication systems, and more particularly, to resource management in an integrated access backhaul (IAB) network, such as, but not limited to, mobile IAB node resource management.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Additionally, wireless communication systems may rely on backhaul networks to exchange information between nodes, such as between base stations or between a base station and a core network. Some backhaul networks may be wired, wireless, or include a combination of wired and wireless links. The backhaul networks may be used to communicate user plane traffic or control plane traffic. A wireless backhaul network may include one or more wireless nodes, such as base stations or UEs. Different wireless nodes may use different sets of resources, such as one of or a combination of time, frequency, space, code, etc., resources, allocated to one or more nodes. For example, a first subset of the set of resources may be allocated to a first subset of nodes of the wireless backhaul network and a second subset of resources may be allocated to a second subset of nodes of the wireless backhaul network. Partitioning the resources in such a manner may minimize interference.

Resource management is typically semi-static and performed by a JAB control node which functions to control the JAB network. Semi-static resource management can be slow and may incur high signaling overhead. Additionally, semi-static resource management does not account for dynamics of the network, such as situations where the JAB network includes one or more mobile JAB nodes. In an JAB network with one or more mobile JAB nodes, a handover of a mobile JAB node from one parent node to another parent node can result in resource conflicts, such as timing conflicts, which can lead to service interruptions to children of the mobile JAB node and child JAB nodes of the mobile node.

SUMMARY

In one aspect of the disclosure, a method of wireless communication includes determining, at a mobile wireless node of a wireless backhaul communications network, a first set of communication resources for use by the mobile wireless node. The method also includes communicating, by the mobile wireless node via one or multiple child links, with one or more wireless devices using the first set of communication resources while the wireless backhaul communications network has a first topology and while the wireless backhaul communications network has a second topology.

In an additional aspect of the disclosure, an apparatus configured for wireless communication is disclosed. The apparatus includes at least one processor, and a memory coupled to the processor. The processor is configured to determine, at a mobile wireless node of a wireless backhaul communications network, a first set of communication resources for use by the mobile wireless node. The processor is further configured to initiate, by the mobile wireless node via one or multiple child links, communication with one or more wireless devices using the first set of communication resources while the wireless backhaul communications network has a first topology and while the wireless backhaul communications network has a second topology.

In an additional aspect of the disclosure, an apparatus configured for wireless communication includes means for determining, at a mobile wireless node of a wireless backhaul communications network, a first set of communication resources for use by the mobile wireless node. The apparatus also includes means for communicating, by the mobile wireless node via one or multiple child links, with one or more wireless devices using the first set of communication resources while the wireless backhaul communications network has a first topology and while the wireless backhaul communications network has a second topology.

In an additional aspect of the disclosure, a non-transitory computer-readable medium having program code recorded thereon. The program code further includes code to determine, at a mobile wireless node of a wireless backhaul communications network, a first set of communication resources for use by the mobile wireless node. The program code further includes code to initiate, by the mobile wireless node via one or multiple child links, communication with one or more wireless devices using the first set of communication resources while the wireless backhaul communications network has a first topology and while the wireless backhaul communications network has a second topology.

In an additional aspect of the disclosure, an apparatus configured for wireless communication includes an interface configured to receive at least a portion of message. The apparatus also includes a processor system configured to: determine, at a mobile wireless node of a wireless backhaul communications network, a first set of communication resources for use by the mobile wireless node; and initiate, by the mobile wireless node via one or multiple child links, communication with one or more wireless devices using the first set of communication resources while the wireless backhaul communications network has a first topology and while the wireless backhaul communications network has a second topology.

In an additional aspect of the disclosure, a method of wireless communication includes determining, at a control node of a wireless backhaul communications network, a first set of communication resources for use by a relay node of the wireless backhaul communications network based on a mobility state of the relay node. The method also includes transmitting, by the control node, a first resource indicator corresponding to the first set of communication resources.

In an additional aspect of the disclosure, an apparatus configured for wireless communication is disclosed. The apparatus includes at least one processor, and a memory coupled to the processor. The processor is configured to determine, at a control node of a wireless backhaul communications network, a first set of communication resources for use by a relay node of the wireless backhaul communications network based on a mobility state of the relay node. The processor is further configured to initiate, by the control node, transmission of a first resource indicator corresponding to the first set of communication resources.

In an additional aspect of the disclosure, an apparatus includes means for determining, at a control node of a wireless backhaul communications network, a first set of communication resources for use by a relay node of the wireless backhaul communications network based on a mobility state of the relay node. The apparatus also includes means for transmitting, by the control node, a first resource indicator corresponding to the first set of communication resources.

In an additional aspect of the disclosure, a non-transitory computer-readable medium having program code recorded thereon. The program code further includes code to determine, at a control node of a wireless backhaul communications network, a first set of communication resources for use by a relay node of the wireless backhaul communications network based on a mobility state of the relay node. The program code further includes code to initiate, by the control node, transmission of a first resource indicator corresponding to the first set of communication resources.

In an additional aspect of the disclosure, an apparatus configured for wireless communication includes a processing system configured to determine, at a control node of a wireless backhaul communications network, a first set of communication resources for use by a relay node of the wireless backhaul communications network based on a mobility state of the relay node; and initiate, by the control node, transmission of a first resource indicator corresponding to the first set of communication resources. The apparatus further includes an interface configured to send the first resource indicator.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 5A-5B illustrate different configurations of an IAB network topology according to aspects of the present disclosure.

FIG. 5C illustrates an IAB network resource sharing method according to aspects of the present disclosure.

FIG. 6 is a block diagram illustrating example blocks executed by a base station.

FIG. 7 is a block diagram illustrating example blocks executed by a base station.

DETAILED DESCRIPTION

Figure 1:
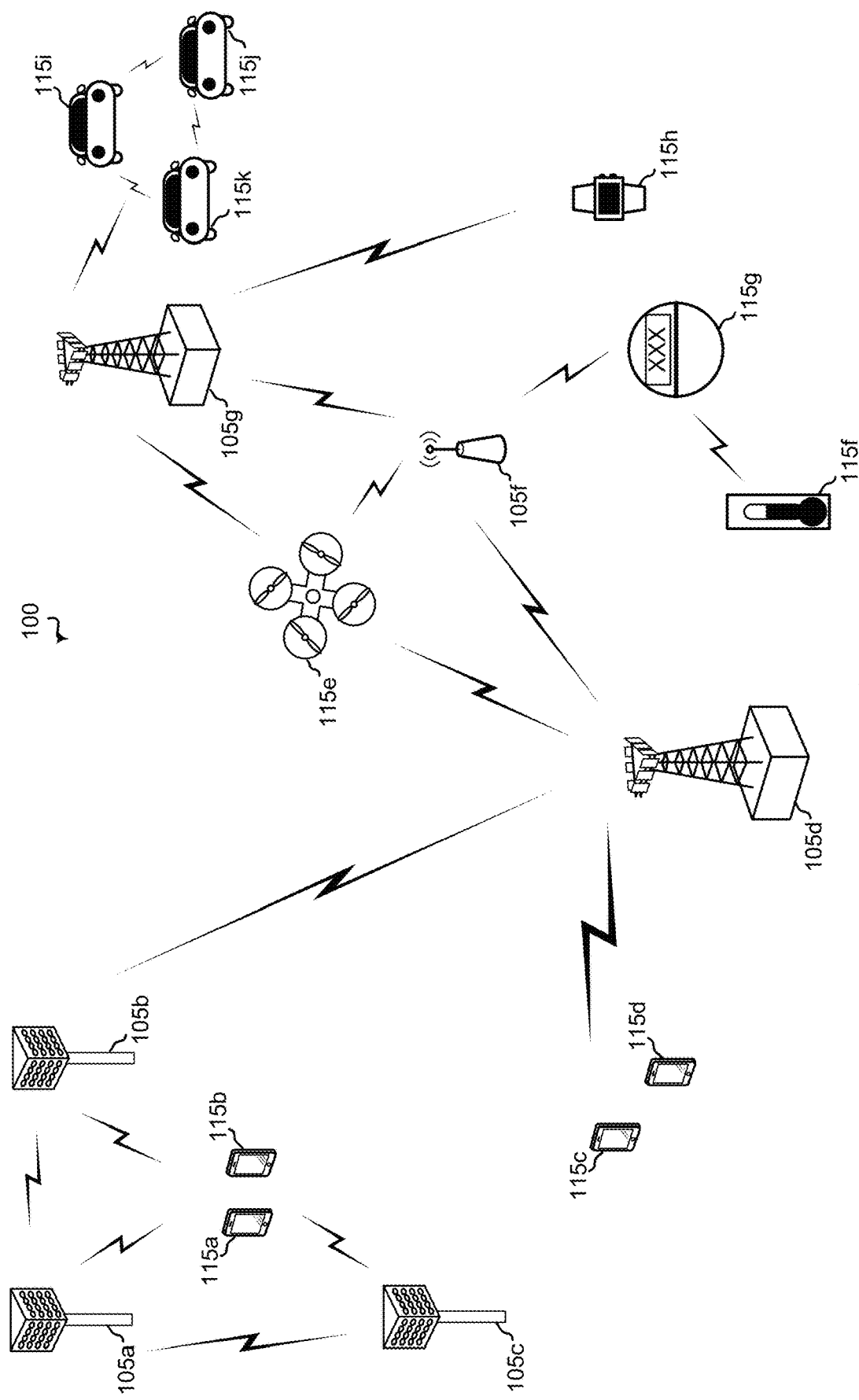
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP LTE is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be implemented in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, or as instructions stored on a computer readable medium for execution on a processor or computer. Furthermore, an aspect may include at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
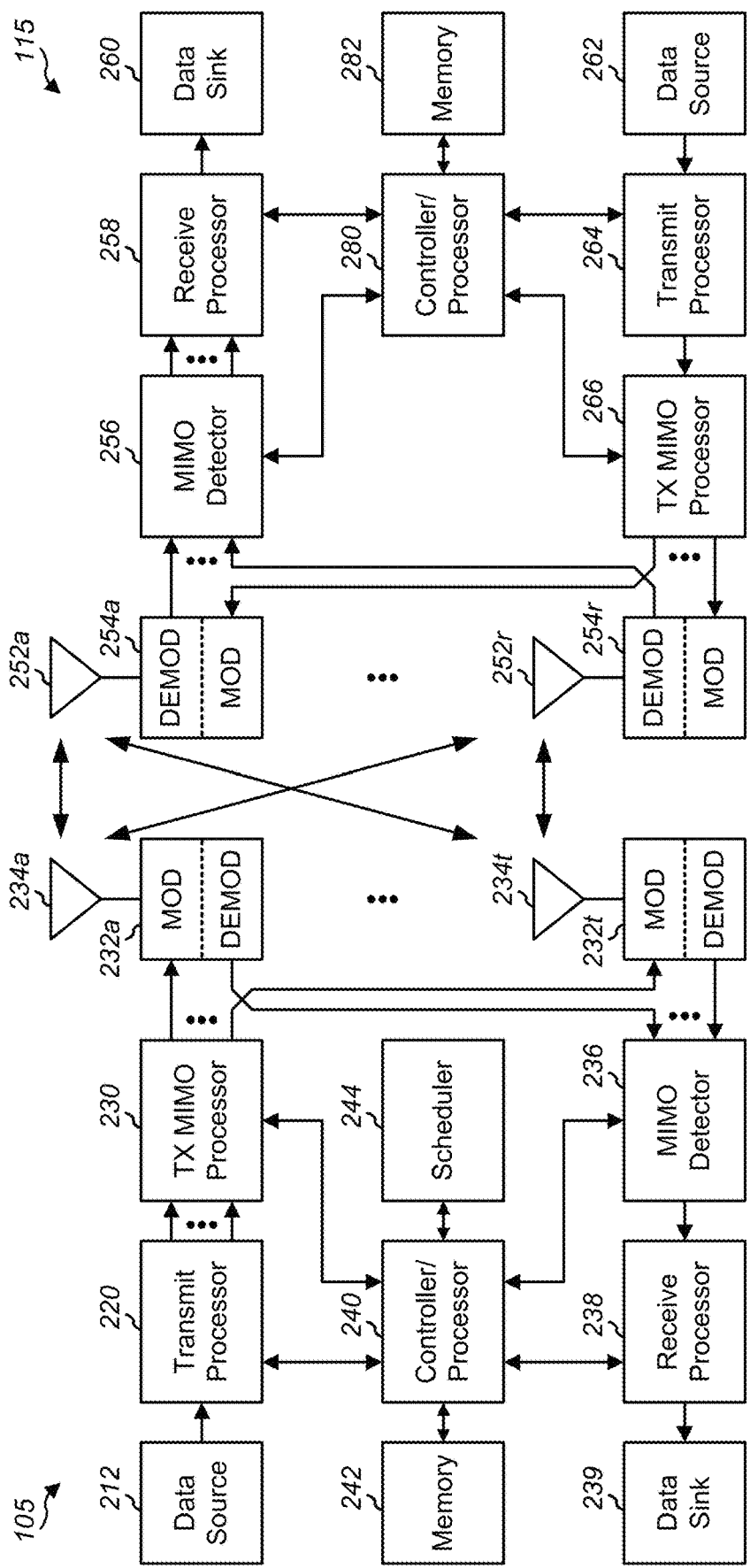
FIG. 2 is a block diagram illustrating a design of a base station and a user equipment (UE) configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) MIMO processor 230 may perform spatial processing (e.g., precoding) on the data symbols, the control symbols, or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 or other processors and modules at the base station 105 may perform or direct the execution of various processes for the techniques described herein. The controllers/processor 280 or other processors and modules at the UE 115 may also perform or direct the execution of the functional blocks illustrated in FIGS. 6 and 7, or other processes for the techniques described herein. The memories 242 and 282 may store data and program codes for the base station 105 and the UE 115, respectively. A scheduler 244 may schedule UEs for data transmission on the downlink or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5g network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
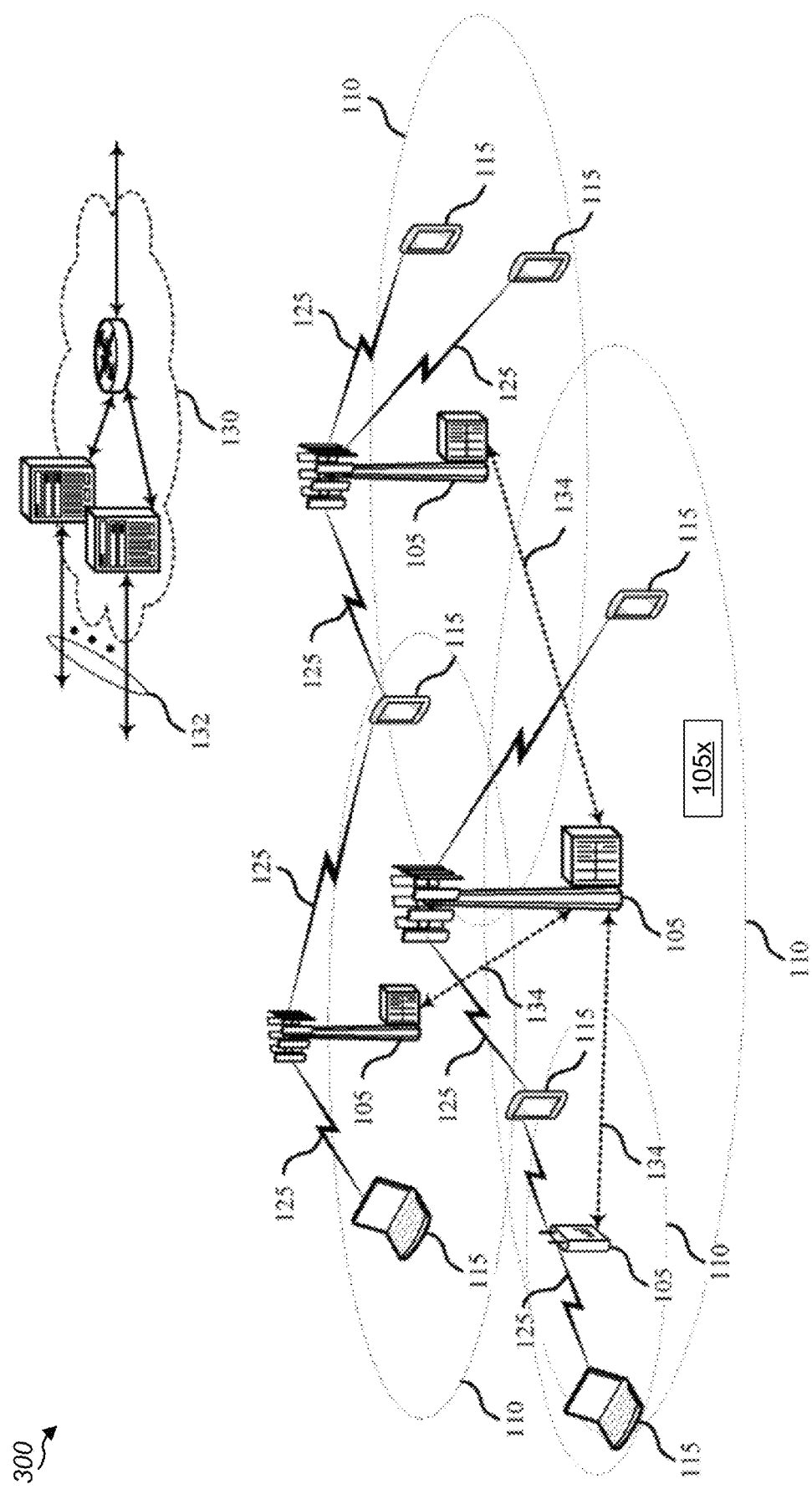
FIG. 3 is a block diagram illustrating a wireless communication system that supports resource management in a wireless backhaul network in accordance with aspects of the present disclosure.

FIG. 3 illustrates an example of a wireless communications system 300 in accordance with various aspects of the present disclosure. Wireless communications system 300 includes base stations 105, UEs 115, and a core network 130. As shown, at least one of the base stations 105 includes a mobile base station 105x. Wireless communications system 300 may include or correspond to wireless communication network 100. In some examples, wireless communications system 300 may be a LTE, LTE-Advanced (LTE-A) network, or a NR network. In some cases, wireless communications system 300 may support enhanced broadband communications, ultra-reliable (i.e., mission critical) communications, low latency communications, and communications with low-cost and low-complexity devices.

Base stations 105, including mobile base station 105x, may wirelessly communicate with UEs 115 via one or more base station antennas. Each base station 105 may provide communication coverage for a respective geographic coverage area 110. Wireless access links 125 shown in wireless communications system 300 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 300, and each UE 115 may be stationary or mobile. In some cases, a UE 115 may also be able to communicate directly with other UEs (e.g., using a peer-to-peer (P2P) protocol or a device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., SI, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (e Bs) 105.

A base station 105 may be connected by an SI interface to the core network 130. The core network may be an evolved packet core (EPC), which may include at least one mobility management entity (MME), at least one serving gateway (S-GW), and at least one packet data network (PDN) gateway (P-GW). The MME may be the control node that processes the signaling between the UE 115 and the EPC. All user Internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 300 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 300 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 300 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape or steer an overall antenna beam in the direction of a target receiver (e.g., a UE 115). This may be achieved by combining elements in an antenna array in such a way that transmitted signals at particular angles experience constructive interference while others experience destructive interference.

MIMO wireless systems use a transmission scheme between a transmitter (e.g., a base station 105) and a receiver (e.g., a UE 115), where both transmitter and receiver are equipped with multiple antennas. Some portions of wireless communications system 300 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beam-formed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or multiple antenna arrays to conduct beamforming operations for directional communications with a UE 115.

In some cases, wireless communications system 300 may be a packet-based network that operates according to a layered protocol stack. In the user plane, communications at the bearer or packet data convergence protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use Hybrid ARQ (HARD) to provide retransmission at the MAC layer to improve link efficiency. In the control plane, the radio resource control (RRC) protocol layer may provide establishment, configuration, and maintenance of an RRC connection between a UE 115 and a base station 105, or core network 130 supporting radio bearers for user plane data. At the physical (PHY) layer, transport channels may be mapped to physical channels.

Time intervals in LTE or NR may be expressed in multiples of a basic time unit (which may be a sampling period of $Ts=1/30,720,000$ seconds). Time resources may be organized according to radio frames of length of 10 ms (Tf=307200TS), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain twelve consecutive subcarriers in the frequency domain and, for a normal cyclic prefix in each OFDM symbol, seven consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 300 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 300 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in a NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 300 may utilize both licensed and unlicensed radio frequency spectrum bands. For example, wireless communications system 300 may employ LTE license assisted access (LTE-LAA) or LTE unlicensed (LTE U) radio access technology or technology in an unlicensed band such as the 5 Ghz industrial, scientific, and medical (ISM) band. When operating in unlicensed radio frequency spectrum bands, wireless devices such as base stations 105 and UEs 115 may employ LBT procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

In some cases, cellular radio access technologies (RATs), such as mmW-based RATs, may be used to support access traffic between UEs 115 and base stations 105, in addition to backhaul and access traffic among multiple base stations 105. Moreover, both access and backhaul traffic may share the same resources (e.g., as in the case of integrated access and backhaul (IAB)). Such wireless backhaul or IAB solutions may be increasingly beneficial with the evolution of cellular technologies due to enhancements in wireless link capacity and reduction in latency. Further, the use of wireless backhaul links may reduce the cost of dense small cell deployments.

Thus, using a RAT may enable wireless backhaul communication using one or more node functions at a wireless node, such as a base station 105, access node, or UE 115.

Additionally, multiple wireless nodes may communicate in a backhaul network using a schedule that is aligned with a frame structure. For example, a wireless node (e.g., UE 115 or base station 105) may establish a link with different wireless nodes (e.g., UE 115 or base station 105) using a RAT that supports a synchronized frame structure, such as a mmW RAT. The wireless node may identify a first set of common resources for use in access or backhaul communications. The common resource may be allocated for common use by all of the wireless nodes of the wireless backhaul network. The wireless node may identify second set of partitioned resources available for use in access or backhaul communications. The second set of partitioned resources may be partitioned into subsets of resources, each subset allocated for use by a selected subset of wireless nodes of the wireless backhaul network.

Figure 4:
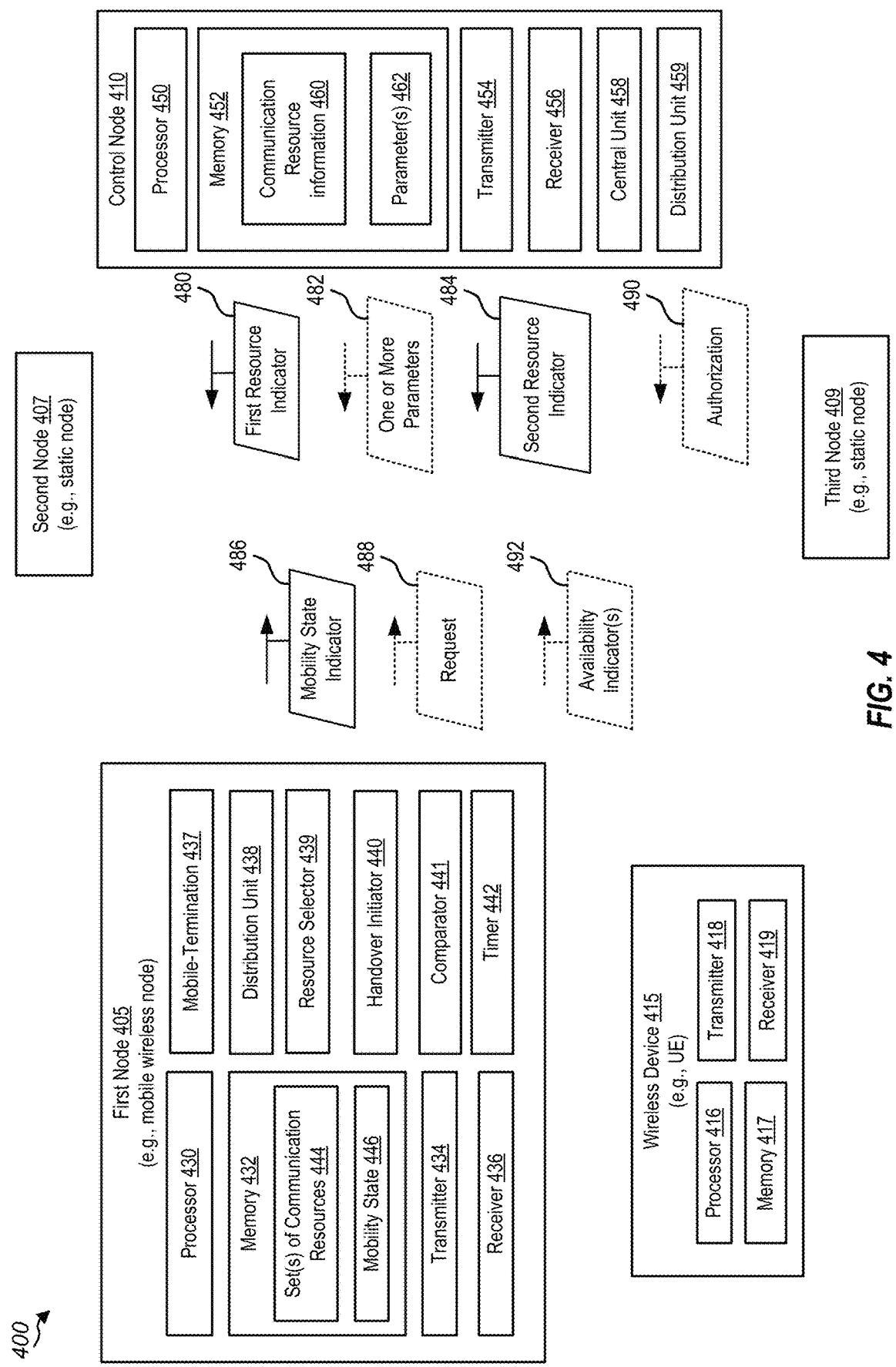
FIG. 4 is a block diagram illustrating a wireless communication system that supports resource management in an integrated access backhaul (IAB) network in accordance with aspects of the present disclosure.

FIG. 4 is a block diagram of an example wireless communications system 400 for resource management in an IAB network. In some examples, wireless communications system 400 may implement aspects of wireless communication network 100 or wireless communications system 300. For example, wireless communications system 400 may include a first node 405 (e.g., a mobile wireless node), a second node 407 (e.g., a static node), a third node 409 (e.g., a static node), a control node 410, and a wireless device 415 (e.g., a UE). Each of first node 405, second node 407, third node 409, and control node 410 may include or correspond to base station 105 such that first node 405, second node 407, third node 409, or control node 410 includes one or more of the same components, is configured to perform one or more operation, or both, as described with reference to base station 105. Wireless communications system 400 may include a IAB control node, such as control node 410, and one or more IAB nodes, such as first node 405, second node 407, and third node 409. The IAB control node may be configured as an access node, or anchor node, with a wireline connection to core network. For example, IAB control node may include an enhanced gNB node with functions to control IAB-network. The one or more IAB nodes may be configured as access nodes which relay traffic from/to the anchor through one or multiple hops. For example, an IAB node may be a L2 relay node that includes mobile-termination (MT) and distributed unit (DU) functions.

Wireless device 415 may include or correspond to UE 115 such that wireless device 415 includes one or more of the same components, is configured to perform one or more operation, or both, as described with reference to UE 115. Although one UE and three base stations are illustrated, in other implementations, wireless communications system 400 may include multiple UEs 115, fewer than or more than three base stations 105, or both. Additionally, or alternatively, although wireless communications system 400 is described as having a single mobile node (e.g., 405), in other implementations, wireless communication system 400 may include multiple mobile nodes.

Wireless device 415 (e.g., UE) includes a processor 416, a memory 417, a transmitter 418, and a receiver 419. Processor 416 may be configured to execute instructions stored at memory 417 to perform the operations described herein. In some implementations, processor 416 includes or corresponds to controller/processor 280, and memory 417 includes or corresponds to memory 282. In addition to the instructions stored at memory 417, memory 417 may be configured to store communication resource information to enable wireless device 415 to communicate with first node 405 or another node.

Transmitter 418 is configured to transmit data to one or more other devices, and receiver 419 is configured to receive data from one or more other devices. For example, transmitter 418 may transmit data, and receiver 419 may receive data, via a network, such as a wired network, a wireless network, or a combination thereof. For example, wireless device 415 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 418 and receiver 419 may be replaced with a transceiver. Additionally, or alternatively, transmitter 418, receiver 419, or both may include or correspond to one or more components of UE 115 described with reference to FIG. 2.

First node 405 includes a mobile node, such as mobile base station 105*x* of FIG. 3. First node 405 includes a processor 430, a memory 432, a transmitter 434, a receiver 436, a mobile termination 437, a distribution unit 438, a resource selector 439, a handover initiator 440, a comparator 441, and a timer 442. Processor 430 may be configured to execute instructions stored at memory 432 to perform the operations described herein. In some implementations, processor 430 includes or corresponds to controller/processor 240, and memory 432 includes or corresponds to memory 242. In addition to the instructions stored at memory 432, memory 432 may be configured to store one or more sets of communication resources 444, such as communication resource information, and a mobility state 446, such as mobility state information. The one or more sets of communication resources 444 may enable first node 405 to communicate with one or more other device of wireless communication network 400 as described further herein. The mobility state 446 may include or correspond to a mobility state of first node 405 or of another device or node of wireless communications system 400. For example, mobility state 446 may indicate that first node 405 is a mobile node or a static node. As another example, mobility state 446 may indicate whether another node, such as second node 407 or third node 408, is a mobile node or a static node.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, first node 405 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of base station 105 described with reference to FIG. 2.

Mobile-termination (MT) 437 is configured as a scheduled node with respect to a parent node or control node 410. In some implementations, MT 437 is configured to provide UE functionality for first node 405 with respect to a distribution unit of anther node, such as second node 407, third node 409, or control node 410. Distribution unit (DU) 438 is configured as a scheduling node that schedules child nodes (e.g., wireless device 415 or a child IAB node) of first node 405. In some implementations, DU 438 is configured to provide base station functionality for node 405 with respect to wireless device 415 or a MT of another node, such as second node 407 or third node 409. Resource selector 439 is configured to selected a set of one or more communication resources (e.g., 444) for use by first node 405. The selected set of one or more communication resources may include a hard resource, a soft resource, or a combination thereof. A hard resource includes a communication resource that DU 438 can assume it can use regardless of a configuration of MT 437. A soft resource includes a communication resource in which its availability is controlled by parent node through an explicit or implicit indication. In some implementations, MT 437 may include or correspond to a first processor (e.g., 430) and DU 438 may include or correspond to a second processor (e.g., 430) that is distinct from the first processor.

Handover initiator 440 is configured to initiate or control a handover operation corresponding to first node 405 in which first node is chances—i.e., is handed over—from a first parent node to a second parent node. For example, first node 405 may have second node 407 has a parent node and a hand over operation may be performed from second node 407 to third node 409 to make third node 409 the parent node of first node 405. Comparator 441 is configured to perform one or more comparisons, such as a comparison between a parameter and a threshold or criterion. A result of the comparison may indicate whether a condition is satisfied, such as a condition in which resource selector 439 selects a set of communication resources (e.g., 444) from multiple sets of communication resources. Timer 442 is configured to determine or identify expiration of a time period.

Control node 410 includes a processor 450, a memory 452, a transmitter 454, and a receiver 456. In some implementations, processor 450 may be configured to execute instructions stores at memory 452 to perform the operations described herein. In addition to the instructions stored at memory 452, memory 452 may be configured to store communication resource information 460 and one or more parameters 462. The communication resource information 460 may enable control node 410 to communicate with one or more other device of wireless communications system 400. Additionally, or alternatively, communication resource information 460 may include or correspond to one or more sets of communication resources of wireless communications system 400 allocated by control node 410 (or a core network) to one or more other nodes as described further herein. The one or more parameters 462 may include at least one parameter or at least one criterion related to selection of a set of communication resources, as described further herein. The one or more parameters 462 may include a mobility state of a distribution unit of the mobile wireless node, a load, a topological state of the distribution unit, a topological state of a parent node of the mobile wireless node, a time period, another parameter, or a combination thereof, as illustrative, non-limiting examples.

Transmitter 454 is configured to transmit data to one or more other devices, and receiver 456 is configured to receive data from one or more other devices. For example, transmitter 454 may transmit data, and receiver 456 may receive data, via a network, such as a wired network, a wireless network, or a combination thereof. For example, control node 410 may be configured to transmit or receive data via a direct device-to-device connection, a LAN, a WAN, a modern-to-modern connection, the Internet, intranet, extranet, cable transmission system, cellular communication network, any combination of the above, or any other communications network now known or later developed within which permits two or more electronic devices to communicate. In some implementations, transmitter 454 and receiver 456 may be replaced with a transceiver. Additionally, or alternatively, transmitter 454, receiver, 456, or both may include or correspond to one or more components of base station 105 described with reference to FIG. 2.

Central unit (CU) 458 is configured as a the central entity that controls can control an JAB network through configuration. For example, CU 458 can allocate one or more communication resources to nodes of the JAB network. In some implementations, CU 458 holds RRC/PDCP layer functions. Distribution unit (DU) 459 is configured as a scheduling node that schedules child nodes. DU 459 may be configured to perform RLC/MAC/PHY layer functions.

Second node 407 and third node 409 may include one or more of the same components, be configured to perform one or more operations, or both, as described with reference to first node 405, control node 410, or both. For example, in some implementations, each of second node 407 and third node 409 may include a MT (e.g., 437) and a DU (e.g., 438, 459). Additionally, or alternatively, second node 407 and third node 409, or both may include or correspond to one or more components of base station 105 described with reference to FIG. 2.

During operation of wireless communications system 400, a set of communication resources, such one or more communication resources in the time-domain, may be dedicated for use or control to a mobile JAB node, such as first node 405. The mobile JAB node, such as first node 405, may maintain ownership of the one or more communication resources if the mobile IAB node changes its parent node, if a network topology changes, or both. For example, control node 410 generates and transmits a first resource indicator 480 corresponding to a first set of communication resources for use by a mobile distribution unit. In some implementations, to generate the first resource indicator 480, control node 410 receives from first node 405, a mobility state indicator 486 of first node 405. In some such implementations, control node 410 may determine the first set of communication resources corresponding to first resource indicator 480 based on mobility state indicator 486.

First node 405 receives first resource indicator 480 corresponding to a first set of communication resources (e.g., 444) for use by distribution unit 438, such as a mobile distribution unit. First node 405 may communication, via a child link, with wireless device 415 using the first set of communication resources.

In some implementations, communicating with wireless device 415 includes using, while wirelessly connected to a first parent node (e.g., 407), the first set of communication resources to communicate with wireless device 414 and using, while wirelessly connected to a second parent node (e.g., 409), the first set of communication resources to communicate with wireless device 415. Additionally, or alternatively, communicating with wireless device 415 includes using, while the wireless backhaul communications network has a first topology, the first set of communication resources to communicate with wireless device 415 and using, while the wireless backhaul communications network has a second topology, the first set of communication resources to communicate with wireless device 415. It is noted that although first node 405 is described as communicating with one wireless device via a child link, in other implementations, first node 405 may communicate via multiple child links with multiple wireless devices, one or more child nodes, or a combination thereof.

In some implementations, first node 405 identifies mobility state 446 of first node 405 as mobile. Based on mobility state 446, resource selector 439 selects the first set of communication resources for use by distributed unit 438. Additionally, or alternatively, first node 405 receives, from control node 410, one or more parameters 482 corresponding to the first set of communication resources. It is noted that one or more parameters 482 may optionally be received as indicated by dashed block. First node 405 may determine whether one or more conditions corresponding to the one or more parameters is satisfied. For example, comparator 441 or timer 442 may determine or indicate whether the one or more conditions are satisfied and resource selector 439 may select one of the sets of communication resources (e.g., 444) based on an indication from comparator 441 or timer 442.

In some implementations, control node 410 generates and transmits a second resource indicator 484 corresponding to a second set of communication resources for use by the mobile distribution unit. First node 405 may identify second resource indicator 484 corresponding to the second set of communication resources. In some such implementations, first node 405 may determine which set of the first set of communication resources and the second set of communication resources to use for communication.

In some implementations, control node 410 determines a set of communication resources (e.g., the first set of communication resources) and partitions the set of communication resources into a first subset of resources and a second subset resources. The first subset of resources may be allocated for use by one or more mobile wireless nodes of the wireless backhaul communications network, and the second subset of resources may be allocated for use by one or more stationary wireless nodes of the wireless backhaul communications network.

In some implementation, first node 405 determines to change from being wirelessly connected to a first parent node (e.g., 407) to being wirelessly connected to a second parent node (e.g., 409) of the wireless backhaul communications network. In some such implementations, based on changing from being wirelessly connected to the first parent node to being wirelessly connected to the second parent node, first node 405 may automatically use the first set of communication resources. Alternatively, first node 405 may transmit a request to 488 to the first set of communication resources during or after a handover operation to change first node 405 from being connected to the first parent node to being connected to the second parent node. It is noted that request 488 may optionally be transmitted as indicated by dashed block. In such implementations, control node 410 may determine whether to authorize first node 405 to use the first set of communication resources after the handover operation. Control node 410 may transmit, to first node 405, authorization 490 to use the first set of communication resources while first node 405 is wirelessly connected to the second parent node. It is noted that authorization 490 may optionally be received as indicated by dashed block. Additionally, or alternatively, control node 410 transmits, to first node 405, second resource indicator 484 corresponding to a second set of communication resources. In such implementations, first node 405 may use the second set of communication resources after the handover operation or may determine, such as based on one or more parameters 482, whether to use the first set of communication resources or the second set of communication resources In some implementations, first node 405 may transmit one or more availability indicators 492. It is noted that availability indicator 492 may optionally be transmitted as indicated by dashed block. First node 405 may transmit, to second node 407, a first availability indicator (e.g., 492) that indicates at least one communication resource of the first set of communication resources is available for use by second node 407. The at least one communication resource may include a soft resource allocated to first node 405 or second node 407. Additionally, or alternatively, first node 405 may transmit, third node 409, a second availability indicator (e.g., 492) that indicates the at least one communication resource of the first set of communication resources is available for use by third node 409. In some such implementations, first node 405 may transmit mobility state indicator 486 to second node 407, third node 409, or both.

In some implementations, control node 410 (e.g., CU 458) received mobility state information of one or more DUs (e.g., 438) of nodes of wireless communications system 400 and determines and indicates, via first resource indicator 480, resource configurations for the nodes based on the mobility state information. The first resource indicator 480 may indicate to first node 405 that DU 438 can use allocated resources without a reconfiguration in situations where first node 405 changes parent nodes. In some implementations, CU 458 may optionally provide at least one parameter 462 included in the one or more parameters 482 to regulate behavior of the mobile DU, such as DU 438. The one or more parameters 482 may indicate or specify at least one criterion or multiple criteria for first node 405 to maintain ownership of the allocated communication resources. For example, the one or more parameters 482 may indicate first node 405 maintains the allocated communication resources if the mobility state of the DU 438 or a parent node indicates a mobile node. As another example, the one or more parameters 482 may indicate first node 405 maintains the allocated communication resources if a load (e.g., a data rate) is greater than or equal to a load threshold. As another example, the one or more parameters 482 may indicate first node 405 maintains the allocated communication resources based on a topological state (e.g., a number of hops, a number of children, or a level) of DU 438 or a parent-node. As another example, the one or more parameters 482 may indicate first node 405 maintains the allocated communication resources if a time period, based on timer 442, has not expired. As another example, the one or more parameters 482 may indicate that multiple conditions are to be satisfied, such as based on a load that is greater than or equal to a load threshold for a time period.

In some implementations, DU 438 may select to use a first set of communication resources corresponding to first resource indicator 480. For example, DU 438 may select the first set of communication resources based on DU's mobility state 446. In such implementations, first node 405 may have received multiple sets of communication resources from CU 458, such as the first set of communication resources corresponding to first resource indicator 480 and a second set of communication resources corresponding to second resource indicator 484. In some implementations, first resource indicator 480 and second resource indicator 484 may be included in the same message. Additionally, the message may include the one or more parameters 482. At least one of the sets of communication resources may be indicated as being allocated as a mobility-based set to enable DU 438 to select maintain ownership of the set.

In some implementations, a set of communications resources allocated to a mobile DU, such as DU 438, may include one or more hard resources. In such implementation, first node 405 may continue to use the same hard resources with its children before a hand-over, after a hand-over, or both. In some implementations, CU 458 may send an authorization 490 to first node 405 to indicate that DU 438 can use the same hard resources. The authorization 490 may be responsive to request 488. Alternatively, DU 438 may assume that it can reuse the same allocated resources, unless CU 458 configures a new set of communication resources for DU 438.

In some implementations, a set of communication resources allocated to a mobile DU, such as DU 438, may include one or more hard resources that are owned or controlled by DU 438. The set of communication resources may also include one or more soft resources that may be used by one or more stationary nodes (e.g., a DU of a stationary node) as a secondary user. The availability of the one or more soft resources may be determined by a child node. To illustrate, if there is no child mobile IAB node, a stationary node may use the one or more soft resources. However, if there is a child mobile IAB node, such as first node 405, the stationary IAB node can use these resource if use of the one or more soft resources does not impact the communication of child mobile IAB node with its own children, or if the one or more soft resources is explicitly released by the child mobile IAB node. In such implementations, a mobile IAB node, such as first node 405, transmits mobility status indicator 468 to indicate to other nodes, such as second node 407 and third node 409, that it is a mobile IAB node. To illustrate, if a stationary IAB node does not receive a mobility status indicator that indicates a mobile IAB node is present as a child node, the stationary IAB node may use the one or more soft resources. Alternatively, if stationary IAB node receives a mobility status indicator that indicates a mobile IAB node is present as a child node, the stationary IAB node may use the one or more soft resources based on an explicit indication received from the mobile IAB nod, such as an availability indicator that indicates the one or more soft resources is availability for use by a stationary IAB node or another IAB.

In some implementations, a set of communication resources allocated to a mobile DU, such as DU 438, may include one or more hard resources that are owned or controlled by DU 438 and the one or more hard resources may be used for control signals, broadcast signals, or both. Accordingly, at least some amount of resources for the control or broadcast can be dedicated to the mobile DU (e.g., 438), which can reduce an amount of time of a service interruption experienced by the mobile IAB node in the event of a link failure. The control signals may include or correspond to a downlink control indicator (DCI), an uplink control indicator (UCI), a MAC-CE, or a combination thereof. In such implementations, the associated resource may be orthogonal in TD (e.g., TDMed) to the control resources used by the one or more stationary nodes to avoid a half-duplex conflict. The broadcast signals may include synchronization signal blocks (SSBs), remaining minimum system information (RMSI), random access channel (RACH) occasions/messages, or a combination thereof. It is noted that in some implementations, at least a portion of the one or more hard resources for broadcast signals may be commonly used by stations IAB nodes and the mobile IAB node. Additionally, or alternatively, the set of communication resources allocated to a mobile DU, such as DU 438, may include at least one soft resource that is controlled by a parent node of the mobile IAB node. The soft resource(s)

may primarily be used for data communication, such as non-control signals or non-broadcast signals.

Thus, FIG. 4 describes systems, devices, and methods in which resource management of an IAB-network accounts for one or more mobile IAB nodes. In the IAB network with one or more mobile IAB-nodes, the IAB node may advantageously maintain control of one or more allocated communication resources before, during, or after a handover of a mobile IAB node from one parent node to another parent node or before, during, or after a change in network topology. Maintaining control of the allocated resources in such situations can result in reduced resource conflicts, such as timing conflicts, which can lead to a reduced number of service interruptions to the mobile IAB node, children of the mobile IAB node, and child IAB nodes of the mobile node.

Referring to FIGS. 5A-5C, FIGS. 5A and 5B illustrate different configurations of an IAB network topology and FIG. 5C illustrates an IAB network resource sharing method designated 590. For example, FIG. 5A illustrates a first topology 500 and FIG. 5B illustrates a second topology 550. The topologies 500, 550 may be employed by the networks 100, and 300, 400. For example, the BSs 105 and the UEs 115 can be configured to form a logical spanning tree configuration(s) as shown in the topologies 500, 550 for communicating access traffic, backhaul traffic, or both. The topologies 500, 550 may include control node 410, first node 405, second node 407, third node 409, wireless device 415, and UE 115. Control node 410 may be coupled to a backhaul link 134, such as an optical fiber link, for communication with a core network (e.g., the core network 130).

The topologies 500, 550 include a plurality of logical levels 502, 504, 506. In some other implementations, the topologies 500, 550 can include any suitable number of levels, such as two, three, four, five, six, or more. Each level 502, 504, 506 may include a combination of UEs 115 and BSs 105 interconnected by logical links. For example, a logical link between a BS 105 and a UE 115 may correspond to a wireless access link 125, whereas a logical link 404 between two BSs 105 may correspond to a wireless backhaul link 134. The BSs 105 and the UEs 115 may be referred to as relay nodes in the topologies 500, 550.

The nodes (e.g., the BSs 105) in the level 502 can function as relays for the nodes in the level 504, for example, to relay backhaul traffic between the nodes and the control node 410. Similarly, the nodes (e.g., the BSs 105) in the level 504 can function as relays for the nodes in the level 506. For example, the nodes in the level 502 are parent nodes to the nodes in the level 504, and the nodes in the level 506 are child nodes to the nodes in level 504.

A base station (BS) 105 (e.g., 409) in the level 504 may function as an access node when communicating with a BS 105 or a UE 115 in the level 506. Alternatively, the BS 105 may function as a UE when communicating with a BS 105 in the level 502. When a communication is with a node in a higher level or with a less number of hops to the control node 410, the communication is referred to as a UL communication. When a communication is with a node in a lower level or with a greater number of hops to the control node 410, the communication is referred to as a DL communication. In some implementations, the control node 410 may allocate resources for the links.

Referring to FIG. 5C, an IAB network resource sharing method 590 according to one or more aspects of the present disclosure is shown and generally designated 590. The method 590 illustrates resource partitioning for use in the topologies 500, 550. In FIG. 5C, the x-axis represents time in some constant units. The method 590 time-partition resources in an IAB network (e.g., the networks 100, wireless communications system 300 300, or 400) into resources 592, 594, 596. The resources 592, 594, 596 can include time-frequency resources. For example, each resource 592, 594, 596 may include a number of symbols (e.g., OFDM symbols) in time, a number of subcarriers in frequency, or both. In some implementation, each resource 592, 594, 596 shown may correspond to a subframe, a slot or sub-slot, or a TTI, which may carry one MAC layer transport block.

As an example, the method 590 may assign the resources 592 to the links between control node 410 and nodes at level 502, and links between nodes at level 504 and nodes at level 506. The method 590 may assign the resources 594 to the links for communicating UL or DL traffic between nodes at level 502 and nodes at level 504. The method 590 may assign the resources 596 to mobile nodes, such as first node 405. The time-partitioning of the resources in the alternating manner shown in the method 590 can reduce interference between the different levels 502, 504, 506, overcome the half-duplex constraint, reduce transmit-receive gap periods, or a combination thereof.

Referring to FIG. 5A, the topology 500 includes first node 405 linked to second node 407 using resource 594. First node 405 is also linked to wireless device 415 and UE 115 using resource 596. As indicated in FIG. 5A by the arrow labeled moving, first node 405 is a mobile IAB node that is mobile and can be a parent node. Accordingly, referring to FIG. 5B, first node 405 is no longer coupled to second node 407 as a parent node, but, rather, is coupled to third node 409 as a parent node. To illustrate, the topology 550 includes first node 405 linked to third node 409 using resource 592. First node 405 is also linked to wireless device 415 and UE 115 using resource 596. By using resource 596 to be linked to wireless device 415 and UE 115, mobile wireless node can avoid a resource conflict, and an interruption of service, when first node 405 changes parent nodes—e.g., changes parent nodes that are on different levels.

Figure 9:
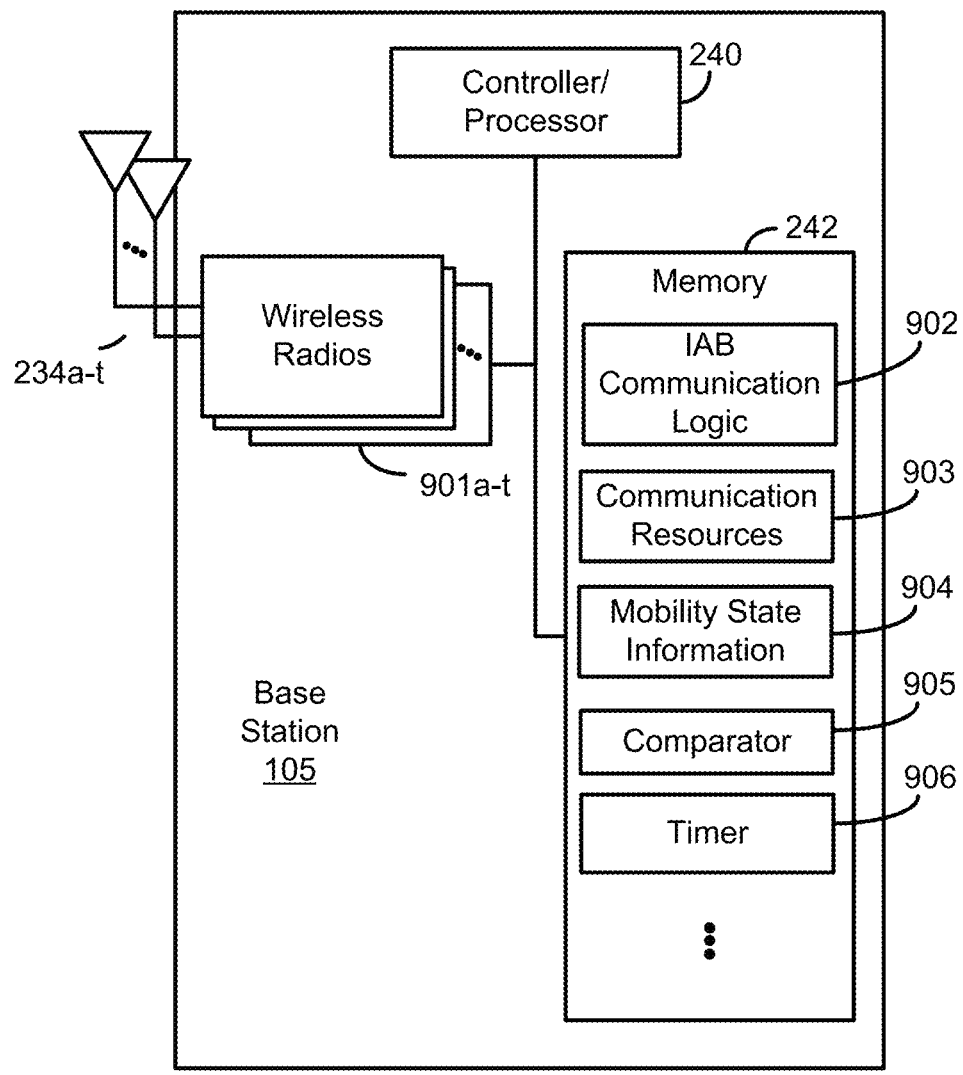
FIG. 9 is a block diagram conceptually illustrating an example design of a base station.

FIGS. 6 and 7 are block diagrams illustrating example blocks executed by a base station configured according to an aspect of the present disclosure. The example blocks will also be described with respect to base station 105 as illustrated in FIG. 9, which may include or correspond to base station 105 or first node 405, second node 407, third node 409, or control node 410 of FIG. 4. FIG. 9 is a block diagram illustrating base station 105 configured according to one aspect of the present disclosure. Base station 105 includes the structure, hardware, and components as illustrated for base station 105 of FIG. 2 or first node 405, second node 407, third node 409, or control node 410 of FIG. 4. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 901a-t and antennas 234a-t. Wireless radios 901a-t includes various components and hardware, as illustrated in FIG. 2 for base station 105, including modulator/demodulators 232a-t, transmit processor 220, TX MIMO processor 230, MIMO detector 236, and receive processor 238. As shown, memory 242 may include JAB communication logic 902, communication resources information 903, mobility state information 904, a comparator 905, and a timer 906. JAB communication logic 902 may include or correspond to MT 437, DU 438, CU 458, DU 459. In some aspects, IAB communication logic 902 may include or correspond to processor(s) 430, 450. Communication resources information 903 may include or correspond to one or more sets of communication resources 444, communication resource information 460, first resource indicator 480, or second resource indicator 484. Mobility state information 904 may include or correspond to mobility state 446 or mobility state indicator 486. Comparator 905 and timer 906 may include or correspond to comparator 441 and timer 442, respectively.

Figure 8:
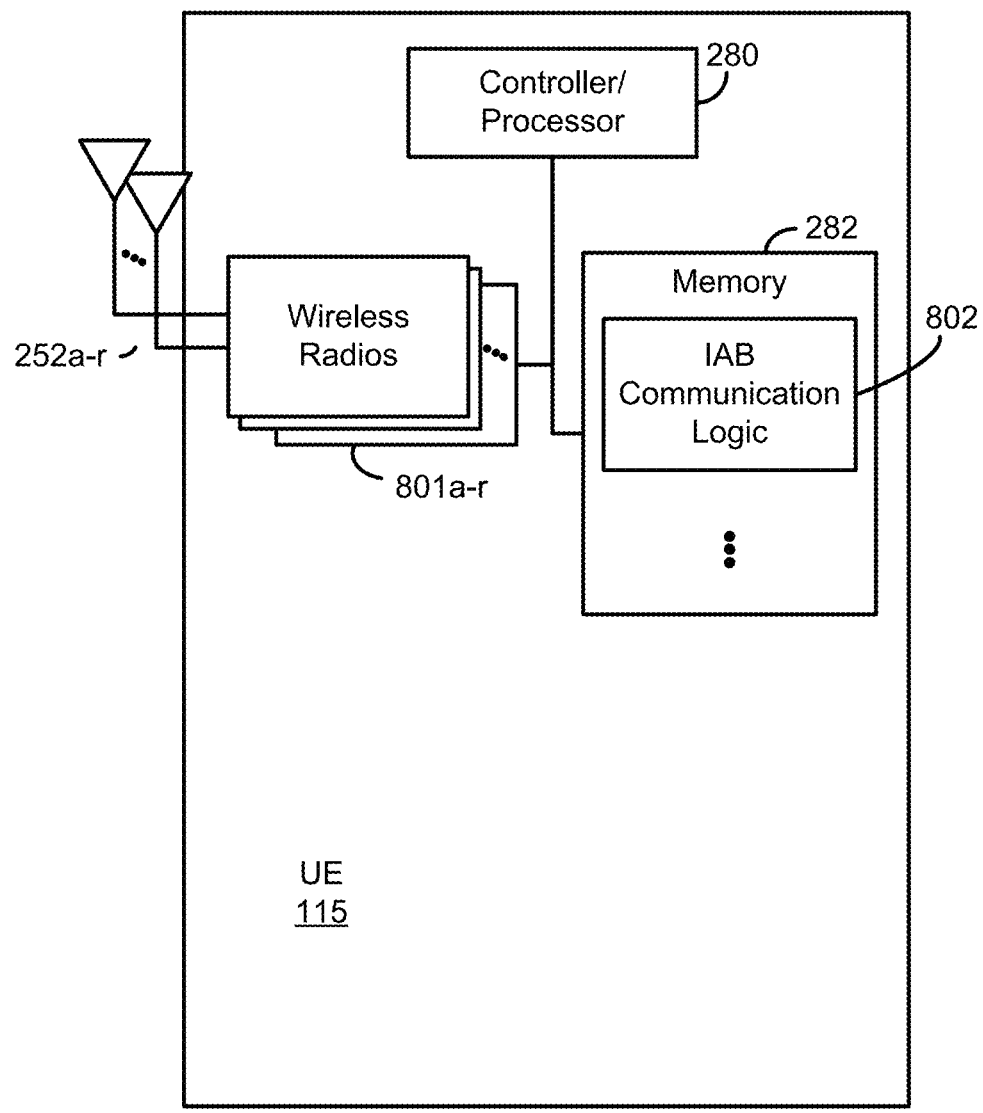
FIG. 8 is a block diagram conceptually illustrating an example design of a UE.

The IAB communication logic 902 may be implemented via hardware, software, or combinations thereof. For example, the JAB communication logic 902 may be implemented as a processor, circuit, or instructions stored in the memory 242 and executed by the processor 240. The IAB communication logic 902 may be used for various aspects of the present disclosure. For example, the IAB communication logic 902 is configured to maintain multiple synchronization references, provide synchronization information (e.g., including timing or frequency) associated with the synchronization references to other nodes, receive synchronization information from other nodes, receive synchronization adjustment commands, adjust synchronization references based on the received synchronization information or the received commands, receive scheduling information (e.g., gap periods, transmission timing, or reception timing) for communication with nodes at a higher level, determine scheduling information for communication with nodes at a lower level, or communicate with nodes based on the received scheduling information and the determined scheduling information. Base station 105 may receive signals from or transmit signal to a UE, such as UE 115 as illustrated in FIG. 8, or with another base station.

Referring to FIG. 6, at block 600, a mobile wireless node of a wireless backhaul communications network determines a first set of communication resources for use by the mobile wireless node. For example, the mobile wireless, such as the base station 105, may receive the first resource indicator using wireless radios 901a-t and antennas 234a-t to communicate with the wireless device. The first set of communication resources may include a time-domain resource. In some implementations, the first set of communication resources includes a hard resource configured to be used independent of a configuration of a mobile-termination of the mobile wireless node. Additionally, or alternatively, the first set of communication resources may include a soft resource.

At block 601, the mobile wireless node communicates, via one or multiple child links, with one or more wireless devices using the first set of communication resources while the wireless backhaul communications network has a first topology and while the wireless backhaul communications network has a second topology. The one or more wireless devices may include or correspond to UE 115 or wireless device 415. For example, the mobile wireless node, such as the base station 105, may transmit or receive at least one message using wireless radios 901a-t and antennas 234a-t to communicate with the one or more wireless devices.

In some implementations, a block may be included in which the mobile wireless node receives an indication of multiple sets of communication resources. In some such implementations, a block may be included in which the mobile wireless node identifies the mobility state of the mobile wireless node as mobile. The mobility state may include or correspond to mobility state information 904. In some such implementations, a block may be included in which the mobile wireless node selects the first set of communication resources from the multiple sets of communication resources based on the mobility state being mobile. For example, the IAB communication logic 902 may select the first set of communication resources form the communication resources information 903.

In some implementations, communicating with the one or more wireless devices may include using, by the mobile wireless node while wirelessly connected to a first parent node of the wireless backhaul communications network, the first set of communication resources to communicate with the wireless device, and using, by the mobile wireless node while wirelessly connected to a second parent node of the wireless backhaul communications network, the first set of communication resources to communicate with the wireless device. In some implementations, a block may be included in which the mobile wireless node transmits a mobility state indicator—indicating whether the mobile wireless node is a mobile wireless node or a stationary mobile node—of the mobile wireless node to a control node of the wireless backhaul communications network. The mobile state indicator may include or correspond to the mobility state indicator 486. The first set of communication resources corresponding to the first resource indicator is based on the mobility state indicator of the mobile wireless node. In some implementations, the first resource indicator indicates one or more parameters corresponding to use of the first set of communication resources. The one or more parameters may include a mobility state of the mobile wireless node, a load, a topological state of the distribution unit, a topological state of a parent node of the mobile wireless node, a time period, another parameter, or a combination thereof, as illustrative, non-limiting examples. The one or more parameters may include or correspond to the one or more parameters 462.

In some implementations, a block may be included in which the mobile wireless node receives one or more parameters corresponding to the first set of communication resources. A block may also be included in which the mobile wireless node determines whether one or more conditions corresponding to the one or more parameters is satisfied. For example, the comparator 905, the IAB communication logic 902, or both may determine whether the one or more conditions are satisfied. To illustrate, the first set of communication resources are used by the mobile wireless node to communicate with the one or more wireless devices based on a determination that the one or more conditions are satisfied.

In some implementations, a block may be included in which the mobile wireless node identifies a second resource indicator corresponding to a second set of communication resources. The mobile wireless node may determine which set of the first set of communication resources and the second set of communication resources to use for communication. For example, one or more blocks may be included in which the mobile wireless node determines a mobility state of the mobile wireless node and selects the set based on the mobility state.

In some implementations, one or more blocks may be included in which the mobile wireless node determines to change from being wirelessly connected to a first parent node of the wireless backhaul communications network to being wirelessly connected to a second parent node of the wireless backhaul communications network. For example, the first patent node may include or correspond to second node 407 and the second parent node may include or correspond to third node 409. The mobile wireless node may communicate with the one or more wireless devices, such as wireless device 415 or UE 115, using the first set of communication resources while wirelessly connected to the second parent node.

In some implementations, the mobile wireless node may receive, from the control node, authorization to use the first set of communication resources while wirelessly connected to the second parent node. The authorization may include or correspond to authorization 490. Alternatively, the mobile wireless node may automatically use the first set of communication resources based on changing from being wirelessly connected to the first parent node to being wirelessly connected to the second parent node. In some implementations, a block may be included in which the mobile wireless node transmits, to a control node of the wireless backhaul communications network, a request to use the first set of communication resources while wirelessly connected to the second parent node and receives the authorization or a new set of communication resources responsive to the request. For example, the request may include or correspond to request 488.

In some implementations, a block may be included in which the mobile wireless node receives a second resource indicator corresponding to a second set of communication resources. The second resource indicator may include or correspond to second resource indicator 484. For example, the mobile wireless node may receive the second resource indicator based on a determination to change from being wirelessly connected to a first parent node of the wireless backhaul communications network to being wirelessly connected to a second parent node of the wireless backhaul communications network. The mobile wireless node may communicate using the second set of communication resources based on changing to be wirelessly connected to the second parent node.

In some implementations, the mobile wireless node may transmit a mobility state indicator of the mobile wireless node to the wireless node that indicates that the mobile wireless node is a mobile wireless node of the wireless backhaul communications network. The mobility state indicator may include or correspond to mobility state indicator 486. Additionally, or alternatively, a block may be included in which the mobile wireless node transmits, to a wireless node of the wireless backhaul communications network, an availability indicator that indicates at least one communication resource of the first set of communication resources is available for use by the wireless node. The at least one communication resource may be a soft resource allocated to the wireless node. The availability indicator may include or correspond to availability indicator 492. In some implementations, the wireless node is a parent node of the mobile wireless node.

In some implementations, a first communication resource of the first set of communication resources is configured to communicate first control information and is orthogonal to a time domain to a second communication resource of a second set of communication resources. For example, the second communication resource configured to be used by a wireless node to communication second control information. In some such implementations, the wireless node, such as second node 407, is a mobility type of a stationary wireless node. Additionally, or alternatively, a third communication resource of the first set of communication resources may be configured to communicate broadcast information, such as a broadcast message. The broadcast information may include SSBs, RMSI, RACH messages, or a combination thereof, as illustrative, non-limiting example. Additionally, or alternatively, a fourth communication resource of the first set of communication resources includes a soft resource in which an availability of the soft resource is controlled by a parent node of the mobile wireless node.

Referring to FIG. 7, at block 700, a control node, such as a base station, of a wireless backhaul communications network determines a first set of communication resources for use by a relay node of the wireless backhaul communications network based on a mobility state of the relay node. The control node may include or correspond to control node 410. The relay node may include or correspond to first node 405, second node 407, or third node 409, as illustrative, non-limiting examples.

The first set of resources may include a time-domain resource. In some implementations, the first set of resources includes a hard resource configured to be used independent of a configuration of a mobile-termination of a mobile wireless node of the wireless backhaul communications network, a soft resource in which an availability of the soft resource is controlled by a parent node of the wireless backhaul communications network, or a combination thereof. In some implementations, the first communication resource of the first set of communication resources may include the hard resource that is configured to communicate first control information. Additionally, or alternatively, a second communication resource of the first set of communication resources is configured to communicate broadcast information. The broadcast information may include SSBs, RMSI, RACH messages, or a combination thereof, as illustrative, non-limiting examples. Additionally, or alternatively, a third communication resource of the first set of communication resources may include a soft resource in which an availability of the soft resource is controlled by a parent node. The first communication resource may be orthogonal to a time domain to a communication resource of a second set of communication resources and the second communication resource is configured to be used by a wireless node to communication second control information.

At block 701, the control node transmits a first resource indicator corresponding to the first set of communication resources. For example, the base station 105 may transmit the first resource indicator using wireless radios 901*a-t* and antennas 234*a-t*. The first resource indicator may include or correspond to first resource indicator 480.

In some implementations, a block may be included in which the control node receives, from the relay node of the wireless backhaul communications network, a mobility state indicator of the relay node. In some such implementations, the control node determines the first set of communication resources corresponding to the first resource indicator based on the mobility state indicator. The mobility state indicator may indicate that the mobile wireless node is a mobile wireless node or is a stationary node. The mobility state indicator may include or correspond to mobility state indicator 486.

In some implementations, a block may be included in which the control node determines one or more parameters corresponding to use of the first set of communication resources. The one or more parameters may include or correspond to the one or more parameters 482. In some implementations, the first resource indicator, such as first resource indicator 480, may indicate the one or more parameters. The one or more parameters include a mobility state of a distribution unit of a mobile wireless node, a load, a topological state of the distribution unit, a topological state of a parent node of the mobile wireless node, a time period, another parameter, or a combination thereof.

In some implementations, a block may be included in which the control node receives, from a mobile wireless node of the wireless backhaul communications network, a request to use the first set of communication resources after a handover operation to change the mobile wireless node from being connected to a first parent node of the wireless backhaul communications network to a second parent node of the wireless backhaul communications network. For example, the first parent node may include or correspond to second node 407 and the second parent node may include or correspond to third node 409. The request may include or correspond to request 488. In some implementations, a block may be included in which the control node determines whether to authorize the mobile wireless node to use the first set of communication resources after the handover operation. In some such implementations, the control node transmits, to the mobile wireless node, authorization to use the first set of communication resources while the mobile wireless node is wirelessly connected to the second parent node. The authorization may include or correspond to authorization 490.

In some implementations, the relay node is a stationary wireless node. Additionally, or alternatively, the first set of communication resources includes a soft resource. In some such implementations, the first resource indicator includes a parameter that indicates an availability of the soft resource. For example, the parameter may indicate the availability of the soft resource is determined by a mobile wireless device that is a child node of the relay node. As another example, the parameter may indicate the availability of the soft resource is determined by relay node if the relay node does not have a child node that is a mobile wireless node.

In some implementations, a block may be included in which the control node partitions, the first set of communication resources into a first subset of resources and a second subset resources. The first subset of resources may be allocated for use by one or more mobile wireless nodes of the wireless backhaul communications network, and the second subset of resources may be allocated for use by one or more stationary wireless nodes of the wireless backhaul communications network.

It is noted that one or more blocks (or operations) described with reference to FIGS. 6 and 7 may be combined with one or more blocks (or operations) of another of figure. For example, one or more blocks of FIG. 6 or 7 may be combined with one or more blocks (or operations) of another of FIG. 2, 4, or 9. Additionally, or alternatively, one or more operations described above with reference to FIGS. 1-4, 5A, 5B may be combine with one or more operations described with reference to FIG. 6 or 7.

FIG. 8 is a block diagram illustrating UE 115 configured according to one aspect of the present disclosure. UE 115 includes the structure, hardware, and components as illustrated for UE 115 of FIG. 2 or wireless device 415 of FIG. 4. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 801a-r and antennas 252a-r. Wireless radios 801a-r includes various components and hardware, as illustrated in FIG. 2 for UE 115, including modulator/demodulators 254a-r, MIMO detector 256, receive processor 258, transmit processor 264, and TX MIMO processor 266.

As shown, memory 282 may include IAB communication logic 802. The IAB communication logic 802 may be implemented via hardware, software, or combinations thereof. For example, the IAB communication logic 802 may be implemented as a processor, circuit, or instructions stored in the memory 282 and executed by the processor 280. The IAB communication logic 802 may be used for various aspects of the present disclosure. For example, the IAB communication logic 802 is configured to maintain multiple synchronization references, provide synchronization information (e.g., including timing or frequency) associated with the synchronization references to other nodes (e.g., the BSs 105), receive synchronization information from other nodes, receive synchronization adjustment commands, receive scheduling information (e.g., gap periods, transmission timing, or reception timing), adjust synchronization references based on the received synchronization information or the received commands, or communicate with other nodes based on received scheduling information. UE 115 may receive signals from or transmit signal to a base station, such as base station 105, first node 405, second node 407, third node 409, control node 410, or base station 900 (e.g., 105) as illustrated in FIG. 9.

In some aspects, techniques for resource management in an IAB network may include additional aspects, such as any single aspect or any combination of aspects described below or in connection with one or more other processes or devices described elsewhere herein. In some aspects, resource management in an JAB network may include an apparatus of a wireless backhaul communications network configured to determine a first set of communication resources for use by the apparatus; and communicate, via one or multiple child links, with one or more wireless devices using the first set of communication resources while the wireless backhaul communications network has a first topology and while the wireless backhaul communications network has a second topology. In some implementations, the apparatus is a device, such as a base station. For example, the apparatus may be a mobile device, such as a mobile wireless node. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, operations described with reference to the apparatus may include a method for wireless communication.

In a first aspect, the first set of communication resources include a time-domain resource.

In a second aspect, alone or in combination with the first aspect, the first set of resources includes a hard resource configured to be used independent of a configuration of a mobile-termination of the mobile wireless node.

In a third aspect, alone or in combination with one or more of the first through second aspects, to determine the first set of communication resources, the apparatus is configured to receive an indication of multiple sets of communication resources.

In a fourth aspect, in combination with one or more of the first through third aspects, to determine the first set of communication resources, the apparatus is configured to identify a mobility state of the mobile wireless node as mobile.

In a fifth aspect, in combination with the third and fourth aspects, to determine the first set of communication resources, the apparatus is further configured to select the first set of communication resources from the multiple sets of communications resources based on the mobility state being mobile.

In a sixth aspect, alone or in combination with one or more of the first through fifth aspects, the apparatus if further configured to transmit a mobility state indicator of the mobile wireless node to a control node of the wireless backhaul communications network.

In a seventh aspect, in combination with the sixth aspect, to determine the first set of communication resources, the apparatus is further configured to receive a first resource indicator from the control node, the first resource indicator corresponding to the first set of resources and based on the mobility state indicator of the mobile wireless node.

In an eighth aspect, in combination with the seventh aspect, the mobility state indicator indicates that the mobile wireless node is a mobile wireless node.

In a ninth aspect, alone or in combination with one or more of the first through eighth aspects, to communicate with the one or more wireless devices while the wireless backhaul communications network has the first topology and while the wireless backhaul communications network has the second topology, the apparatus is further configured to use, while wirelessly connected to a first parent node of the wireless backhaul communications network, the first set of communication resources to communicate with the one or more wireless devices.

In a tenth aspect, in combination with the ninth aspect, to communicate with the one or more wireless devices while the wireless backhaul communications network has the first topology and while the wireless backhaul communications network has the second topology, the apparatus is further configured to use, while wirelessly connected to a second parent node of the wireless backhaul communications network, the first set of communication resources to communicate with the one or more wireless device.

In an eleventh aspect, in combination with one or more of the sixth through tenth aspects, the first resource indicator indicates one or more parameters corresponding to use of the first set of communication resources.

In a twelfth aspect, in combination with the eleventh aspect, the one or more parameters include a mobility state of the mobile wireless node, a load, a topological state of the mobile wireless node, a topological state of a parent node of the mobile wireless node, a time period, another parameter, or a combination thereof.

In a thirteenth aspect, in combination with one or more of the sixth through tenth aspects, the apparatus is further configured to receive one or more parameters corresponding to the first set of communication resources.

In a fourteenth aspect, in combination with the thirteenth aspect, the apparatus is further configured to determine whether one or more conditions corresponding to the one or more parameters is satisfied.

In a fifteenth aspect, in combination with the fourteenth aspect, the first set of communication resources are used to communicate with the one or more wireless devices based on a determination that the one or more conditions are satisfied.

In a sixteenth aspect, the apparatus is further configured to receive, from the control node, authorization to use the first set of communication resources while wirelessly connected to a second parent node.

In a seventeenth aspect, in combination with the sixteenth aspect, the apparatus is further configured to transmit, to the control node of the wireless backhaul communications network, a request to use the first set of communication resources while wirelessly connected to the second parent node.

In an eighteenth aspect, in combination with the seventeenth aspect, the authorization is received responsive to the request.

In a nineteenth aspect, the apparatus is further configured to automatically use the first set of communication resources based on changing from being wirelessly connected to the first parent node to being wirelessly connected to the second parent node.

In a twentieth aspect, in combination with the nineteenth aspect, the apparatus is further configured to, based on a determination to change from being wirelessly connected to a first parent node of the wireless backhaul communications network to being wirelessly connected to a second parent node of the wireless backhaul communications network, receive a second resource indicator corresponding to a second set of communication resources.

In a twenty-first aspect, in combination with the twentieth aspect, the apparatus is further configured to communicate using the second set of communication resources based on changing to be wirelessly connected to the second parent node.

In a twenty-second aspect, alone or in combination with one or more of the first through nineteenth aspects, the apparatus is further configured to transmit, to a wireless node of the wireless backhaul communications network, an availability indicator that indicates at least one communication resource of the first set of communication resources is available for use by the wireless node.

In a twenty-third aspect, in combination with the twenty-second aspect, the wireless node is a parent node of the apparatus.

In a twenty-fourth aspect, in combination with the twenty-second aspect, the at least one communication resource includes a soft resource of allocated to the wireless node.

In a twenty-fifth aspect, in combination with one or more of the twenty-second through twenty-fourth aspects, the apparatus is further configured to transmit a mobility state indicator of the apparatus to the wireless node.

In a twenty-sixth aspect, in combination with the twenty-fifth aspect, the mobility state indicator indicates that the apparatus is a mobile wireless node of the wireless backhaul communications network.

In a twenty-seventh aspect, alone or in combination with one or more of the first through twenty-sixth aspects, a first communication resource of the first set of communication resources is configured to communicate first control information and is orthogonal to a time domain to a second communication resource of a second set of communication resources In a twenty-eighth aspect, in combination with the twenty-seventh aspect, the second communication resource configured to be used by a wireless node of the wireless backhaul communications network to communication second control information.

In a twenty-ninth aspect, in combination with the twenty-eighth aspect, the wireless node has a mobility type of stationary.

In a thirtieth aspect, alone or in combination with one or more of the twenty-seventh through twenty-ninth aspects, a second communication resource of the first set of communication resources is configured to communicate broadcast.

In a thirty-first aspect, in combination with the thirtieth aspect, the broadcast information includes SSBs, RMSI, RACH messages, or a combination thereof.

In a thirty-second aspect, in combination with one or more of the twenty-seventh through thirty-first aspects, a third communication resource of the first set of communication resources a soft resource in which an availability of the soft resource is controlled by a parent node.

In some aspects, an apparatus configured for wireless communication, such as a control node of a wireless backhaul communications network, is configured to determine a first set of communication resources for use by a relay node of the wireless backhaul communications network based on a mobility state of the relay node, and transmit a first resource indicator corresponding to the first set of communication resources. In some implementations, the apparatus includes a control node, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, operations described with reference to the apparatus may include a method for wireless communication.

In a thirty-third aspect, the relay node is a mobile wireless node.

In a thirty-fourth aspect, alone or in combination with the thirty-fourth aspect, the apparatus is further configured to receive, from the relay node of the wireless backhaul communications network, a mobility state indicator of the relay node.

In a thirty-fifth aspect, in combination with the thirty-third aspect, the apparatus is further configured to determine the first set of communication resources corresponding to the first resource indicator based on the mobility state indicator.

In a thirty-sixth aspect, in combination with one or more of the thirty-fourth through thirty-fifth aspects, the mobility state indicator indicates that the mobile wireless node is a mobile wireless node.

In a thirty-seventh aspect, alone or in combination with one or more of the thirty-third through thirty-sixth aspects, the apparatus is further configured to determine one or more parameters corresponding to use of the first set of communication resources.

In a thirty-eighth aspect, in combination with the thirty-seventh aspect, the first resource indicator indicates the one or more parameters.

In a thirty-ninth aspect, in combination with one or more of the thirty-seventh through thirty-eighth aspects, the one or more parameters include a mobility state of a distribution unit of the mobile wireless node, a load, a topological state of the distribution unit, a topological state of a parent node of the mobile wireless node, a time period, another parameter, or a combination thereof.

In a fortieth aspect, alone or in combination with one or more of the thirty-third through thirty-ninth aspects, the apparatus is further configured to receive, from a mobile wireless node of the wireless backhaul communications network, a request to use the first set of communication resources after a handover operation to change the mobile wireless node from being connected to a first parent node of the wireless backhaul communications network to a second parent node of the wireless backhaul communications network.

In a forty-first aspect, in combination with the fortieth aspect, the apparatus is further configured to determine whether to authorize the mobile wireless node to use the first set of communication resources after the handover operation.

In a forty-second aspect, in combination with the forty-first aspect, the apparatus is further configured to transmit, to the mobile wireless node, authorization to use the first set of communication resources while the mobile wireless node is wirelessly connected to the second parent node.

In a forty-third aspect, the relay node is a stationary wireless node.

In a forty-fourth aspect, in combination with the forty-third aspect, the first set of communication resources includes a soft resource.

In a forty-fifth aspect, in combination with the forty-fourth aspect, the first resource indicator includes a parameter that indicates an availability of the soft resource.

In a forty-sixth aspect, in combination with the forty-fifth aspect, the parameter indicates the availability of the soft resource is determined by a mobile wireless device that is a child node of the relay node.

In a forty-seventh aspect, in combination with the forty-fifth aspect, the parameter indicates the availability of the soft resource is determined by relay node if the relay node does not have a child node that is a mobile wireless node.

In a forty-eighth aspect, the apparatus is further configured to partition the first set of communication resources into a first subset of resources and a second subset resources.

In a forty-ninth aspect, in combination with the forty-eighth aspect, the first subset of resources allocated for use by one or more mobile wireless nodes of the wireless backhaul communications network.

In a fiftieth aspect, in combination with the forty-ninth aspect, the second subset of resources allocated for use by one or more stationary wireless nodes of the wireless backhaul communications network.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2, 4, 8, or 9) may include processors, electronics devices, hardware devices, electronics components, logical circuits, memories, software codes, firmware codes, etc., or any combination thereof. In addition, features discussed herein relating to 2, 4, 8, or 9 may be implemented via specialized processor circuitry, via executable instructions, or combinations thereof.

Those of skill would further appreciate that the various illustrative logical blocks, modules, circuits, and algorithm steps (e.g., the logical blocks in FIGS. 6 and 7) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be implemented directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
    receiving, at a mobile wireless node of a wireless backhaul communications network from a control node of the wireless backhaul communications network, a first resource indicator corresponding to a first set of communication resources for use by the mobile wireless node of the wireless backhaul communications network, the first resource indicator based on a mobility state indicator of the mobile wireless node; and
    communicating, by the mobile wireless node via one or multiple child links and while the wireless backhaul communications network has each of a first topology and a second topology, with one or more wireless devices using the first set of communication resources determined based on the first resource indictor.

2. The method of claim 1, wherein the first set of communication resources include a time-domain resource.

3. The method of claim 1, wherein the first set of communication resources include a hard resource configured to be used independent of a configuration of a mobile-termination of the mobile wireless node.

4. The method of claim 1, further comprising:
    transmitting, by the mobile wireless node, the mobility state indicator of the mobile wireless node to the control node of the wireless backhaul communications network.

5. The method of claim 1, wherein the mobility state indicator indicates that the mobile wireless node is a mobile wireless node.

6. The method of claim 1, further comprising:
    determining, by the mobile wireless node, the first set of communication resources based on the received first resource indictor, and wherein the first resource indicator indicates one or more parameters corresponding to use of the first set of communication resources.

7. The method of claim 6, wherein the one or more parameters include a mobility state of the mobile wireless node, a load, a topological state of the mobile wireless node, a topological state of a parent node of the mobile wireless node, a time period, another parameter, or a combination thereof.

8. The method of claim 1, further comprising:
receiving, by the mobile wireless node, one or more parameters corresponding to the first set of communication resources; and
determining, by the mobile wireless node, whether one or more conditions corresponding to the one or more parameters is satisfied;
wherein the first set of communication resources are used by the mobile wireless node to communicate with the one or more wireless devices based on a determination that the one or more conditions are satisfied.

9. The method of claim 8, further comprising:
determining, by the mobile wireless node, whether one or more conditions corresponding to the one or more parameters is satisfied.

10. The method of claim 9, wherein the first set of communication resources are used by the mobile wireless node to communicate with the one or more wireless devices based on a determination that the one or more conditions are satisfied.

11. An apparatus configured for wireless communication, comprising:
at least one processor; and
a memory coupled to the at least one processor,
wherein the at least one processor is configured to:
receive, at a mobile wireless node of a wireless backhaul communications network from a control node of the wireless backhaul communications network, a first resource indicator, corresponding to a first set of communication resources for use by the mobile wireless node of the wireless backhaul communications network, the first resource indicator based on a mobility state indicator of the mobile wireless node, the mobile wireless node configured to determine the first set of communication resources for use by the mobile wireless node based on receipt of the first resource indicator; and
initiate, by the mobile wireless node via one or multiple child links and while the wireless backhaul communications network has each of a first topology and a second topology, communication with one or more wireless devices using the first set of communication resources determined based on the first resource indictor.

12. The apparatus of claim 11, wherein, to determine the first set of communication resources, the at least one processor is further configured to:
identify, by the mobile wireless node, a mobility state of the mobile wireless node as mobile; and
select, by the mobile wireless node, the first set of communication resources from multiple sets of communications resources based on the mobility state being mobile.

13. The apparatus of claim 11, wherein, to communicate with the one or more wireless devices while the wireless backhaul communications network has the first topology and while the wireless backhaul communications network has the second topology, the at least one processor is further configured to:
use, by the mobile wireless node while wirelessly connected to a first parent node of the wireless backhaul communications network, the first set of communication resources to communicate with the one or more wireless devices; and
use, by the mobile wireless node while wirelessly connected to a second parent node of the wireless backhaul communications network, the first set of communication resources to communicate with the one or more wireless device.

14. The apparatus of claim 11, wherein the at least one processor is further configured to automatically use, by the mobile wireless node, the first set of communication resources based on changing from being wirelessly connected to a first parent node in the first topology to being wirelessly connected to a second parent node in the second topology.

15. The apparatus of claim 14, wherein the at least one processor is further configured to, based on a determination to change from being wirelessly connected to the first parent node of the wireless backhaul communications network to being wirelessly connected to the second parent node of the wireless backhaul communications network, receive, by the mobile wireless node, a second resource indicator corresponding to a second set of communication resources.

16. The apparatus of claim 15, wherein the at least one processor is further configured to communicate, by the mobile wireless node, using the second set of communication resources based on changing to be wirelessly connected to the second parent node.

17. An apparatus configured for wireless communication, comprising:
means for receiving, at a mobile wireless node of a wireless backhaul communications network from a control node of the wireless backhaul communications network, a first resource indicator, corresponding to a first set of communication resources for use by the mobile wireless node of the wireless backhaul communications network, the first resource indicator based on a mobility state indicator of the mobile wireless node, the mobile wireless node configured to determine the first set of communication resources for use by the mobile wireless node based on receipt of the first resource indicator; and
means for communicating, by the mobile wireless node via one or multiple child links and while the wireless backhaul communications network has each of a first topology and a second topology, with one or more wireless devices using the first set of communication resources determined based on the first resource indicator.

18. The apparatus of claim 17, further comprising means for receiving, from the control node, authorization to use the first set of communication resources while wirelessly connected to a second parent node.

19. The apparatus of claim 18, further comprising means for transmitting, to the control node of the wireless backhaul communications network, a request to use the first set of communication resources while wirelessly connected to the second parent node, wherein the authorization is received responsive to the request.

20. The apparatus of claim 17, further comprising means for transmitting, to a wireless node of the wireless backhaul communications network, an availability indicator that indicates at least one communication resource of the first set of communication resources is available for use by the wireless node.

21. The apparatus of claim 20, wherein the wireless node is a parent node of the mobile wireless node.

22. The apparatus of claim 20, wherein the at least one communication resource comprises a soft resource of allocated to the wireless node.

23. The apparatus of claim 17, further comprising means for transmitting the mobility state indicator of the mobile wireless node to the wireless node, wherein the mobility state indicator indicates that the mobile wireless node is a mobile wireless node of the wireless backhaul communications network.

24. A non-transitory, computer-readable medium storing instructions that, when executed by a processor, cause the processor to perform operations comprising:
receiving, at a mobile wireless node of a wireless backhaul communications network from a control node of the wireless backhaul communications network, a first resource indicator, corresponding to a first set of communication resources for use by the mobile wireless node of the wireless backhaul communications network, the first resource indicator based on a mobility state indicator of the mobile wireless node, the mobile wireless node configured to determine the first set of communication resources for use by the mobile wireless node based on receipt of the first resource indicator; and
communicating, by the mobile wireless node via one or multiple child links and while the wireless backhaul communications network has each of a first topology and a second topology, with one or more wireless devices using the first set of communication resources determined based on the first resource indictor.

25. The non-transitory, computer-readable medium of claim 24, wherein a first communication resource of the first set of communication resources is configured to communicate first control information and is orthogonal to a time domain to a second communication resource of a second set of communication resources.

26. The non-transitory, computer-readable medium of claim 25, wherein the second communication resource is configured to be used by a wireless node of the wireless backhaul communications network to communicate second control information.

27. The non-transitory, computer-readable medium of claim 25, wherein the wireless node has a mobility type of stationary.

28. The non-transitory, computer-readable medium of claim 25, wherein a third communication resource of the first set of communication resources is a soft resource in which an availability of the soft resource is controlled by a parent node.

29. The non-transitory, computer-readable medium of claim 25, wherein a second communication resource of the first set of communication resources is configured to communicate broadcast information.

30. The non-transitory, computer-readable medium of claim 29, wherein the broadcast information includes synchronization signal blocks (SSBs), remaining minimum system information (RMSI), random access channel (RACH) messages, or a combination thereof.

* * * * *